| United States Patent [19] | [11] Patent Number: 4,804,549 |
| Howley et al. | [45] Date of Patent: Feb. 14, 1989 |

[54] PARTICULATE DOG FOOD PALATABILITY ENHANCER AND PROCESS

[75] Inventors: Joseph P. Howley, Flossmoor; William T. Keehn, Danforth; Joanna B. Ford, Homwood; Mary J. Neeb, Kankakee, all of Ill.

[73] Assignee: Gaines Pet Foods Corp., Chicago, Ill.

[21] Appl. No.: 868,170

[22] Filed: May 22, 1986

Related U.S. Application Data

[63] Continuation of Ser. No. 664,628, Oct. 25, 1984, abandoned.

[51] Int. Cl.⁴ ............................................. A23K 1/00
[52] U.S. Cl. .................................... 426/98; 426/602; 426/623; 426/630; 426/647; 426/656; 426/805
[58] Field of Search .................... 426/2, 98, 601, 650, 426/623, 630, 656, 805, 602, 647

[56] References Cited

U.S. PATENT DOCUMENTS

| 3,119,691 | 1/1964 | Ludington et al. | 426/646 |
| 3,745,023 | 7/1973 | Greenberg et al. | 426/602 X |
| 3,857,968 | 12/1974 | Haas et al. | 426/656 |
| 3,968,255 | 7/1976 | Haas et al. | 426/656 |
| 3,997,675 | 12/1976 | Eichelburg | 426/96 |
| 4,053,646 | 10/1977 | Wright et al. | 426/98 X |
| 4,211,797 | 8/1980 | Cante et al. | 426/657 |
| 4,216,234 | 8/1980 | Rawlings et al. | 426/98 |
| 4,217,370 | 8/1980 | Rawlings et al. | 426/98 |
| 4,391,829 | 7/1983 | Spradlin et al. | 426/656 |
| 4,393,085 | 7/1983 | Spradlin et al. | 426/646 |
| 4,404,228 | 9/1983 | Cloosterman et al. | 426/98 |
| 4,702,924 | 10/1987 | Owens et al. | 426/92 |

*Primary Examiner*—R. B. Penland
*Attorney, Agent, or Firm*—St. Onge Steward Johnston & Reens

[57] ABSTRACT

Disclosed is a composition which improves the palatability of dog foods and the methods of making and using it. According to the process, a high free fatty acid fat is emulsified with an encapsulating binder and dried. The fat will preferably contain at least 10% free fatty acids based on the weight of the fat. The free high fatty acid content can be achieved by overt addition or generation by saponification or enzyme action. The composition is dried by spray drying or drum drying.

37 Claims, No Drawings

PARTICULATE DOG FOOD PALATABILITY ENHANCER AND PROCESS

This is a continuation of co-pending application Ser. No. 664,628 filed on 10/25/84 now abandoned.

TECHNICAL FIELD

The present invention relates to pet food, and more particularly to a new palatability enhancer and a process for preparing it which will enhance the acceptability of pet foods, especially dry dog foods.

BACKGROUND ART

Fat has long been applied to dog foods or incorporated into them for purposes of flavor as well as nutrition. Fat, however, as typically applied, has a number of characteristics which limit its usefulness as a palatant. Among these are its tendency to cause grease-staining of packaging and its high caloric content at levels of use which provide optimum palatability. A number of fatty-material-containing palatability enhancers have been developed by the art which are more effective than the typical fat coatings based on tallow.

Among the fatty-material-containing palatability enhancers are those which modify or otherwise specially prepare a fatty material. For example, in U.S. Pat. Nos. 3,857,968 and 3,968,255, Haas and Lugay disclose that a lypolytic and proteolytic enzyme treatment of fat and protein provides a composition which is flavorful to dogs. The composition of Haas and Lugay is preferably incorporated into the food by spraying it on as a liquid emulsion.

In U.S. Pat. No. 4,211,797 to C. J. Cante et al there is disclosed a dog food flavor which can comprise an enzymatic beef digest, fat and a product prepared by the above disclosures of Haas and Lugay. According to this disclosure, all components are separately prepared, mixed and applied to the surface of the dog food as a liquid.

Greenberg et al, in U.S. Pat. No. 3,745,023, disclosed a liquid palatability enhancer based on a blend of specific oils having the readily solidifiable components removed. The resulting product is said to be rich in flavorful free fatty acids. The product is applied to a pet food in the liquid state.

Various of these fatty-material-containing palatability enhancers can provide improvements in the acceptability of dry dog foods. However, it would be desirable to have an enhancer which would provide a greater flavor impact for the dogs. It would be especially desirable to provide such an enhancer in a form which reduced the odor as perceived by humans of the materials found flavorful or desirably aromatic to dogs.

The object of the invention is therefore an improved pet food palatability enhancer.

Another object of the invention is a process for preparing the enhancer.

A further object of the invention is a pet food containing the enhancer.

SUMMARY OF THE INVENTION

The present invention is concerned with a process for preparing the palatability enhancer comprising preparing an aqueous mixture comprising a high free fatty acid fat and an encapsulating binder, and drying the mixture. The present invention is also concerned with a process for preparing the pet food of improved palatability broadly comprising applying the palatability enhancer to the surface of a pet food.

DETAILED DESCRIPTION OF THE INVENTION

A central feature of the present invention is concerned with finding fatty-material-containing palatability enhancers having higher levels of free fatty acids than are naturally present in the fat, which exhibit a more-pronounced effect when applied to the pet food base in dry, particulate form. The fatty-material-containing palatability enhancers of the invention will be enriched in free-fatty content through enzymatic action as disclosed by Haas and Lugay, though blending and/or fractionation are disclosed by Greenberg et al, through chemical treatments such as saponification, or otherwise. For the purpose of definition, these enhancers will be referred to herein as high free fatty acid fats and will preferably include at least 10% free fatty acids based on the weight of the fat, including the free fatty acids and any other fat breakdown products present.

In its broad aspects, the palatability enhancer of the invention comprises high free fatty acid fat in flowable particulate form.

The dog food of the invention will preferably be nutritionally balanced comprising sufficient protein, carbohydrates, fat, vitamins, and minerals, and will have applied to the surface thereof an amount of particulate high free fatty acid fat effective to improve the palatability of the food for dogs.

The term "palatability" is broad and encompasses all of the various properties of dog foods which are sensed by the consuming animal and determine the overall acceptability of the food. Among these properties are texture, taste and aroma. It is believed that the present invention increases palatability as a whole, primarily through improving the taste of the food. Becauste it is applied in dry form and at extremely low levels, it has no perceptible effect on texture.

The preparation of the palatability enhancer according to the present invention, will comprise preparing a mixture including a high free fatty acid fat and an encapsulating binder, drying the mixture, and collecting the resulting dried mixture in flowable particulate form. The high free fatty acid fat can be obtained from any suitable source or process. It should be capable of improving the palatability of a dog food and of being dried from an emulsion or other complex mixture with a suitable binder.

Preparation of the High Free Fatty Acid Fat

The high free fatty acid fat can be derived by suitably treating any suitable triglyceride fat, from either animal or vegetable origin to increase the free fatty acid content, preferably to a level of at least 10% based on the weight of the fat. More preferred free fatty acid contents will be above 30% and most preferably above 40% on this same basis. The fat can be refined and purified prior to treatment, such as by saponfication or overt addition of free fatty acids to increase the free fatty acid content. Preferably, however, the fat is employed as a part of a mixture with a hydrolyzed proteinaceous or farinaceous material for enzymatic treatment such as those disclosed by Haas and Lugay in the patents, referred to above, or that of Howley et al in U.S. Patent Application Ser. No. 595,080 filed March, 1984.

Typical of the fats of animal origin are tallow, chicken fat, lard, and milk-derived fats such as butter oil and that contained in cheese. Among the fats of vegetable origin are coconut oil, soybean oil and corn oil. When employing one of the abovenoted enzymatic processes, the fat can be employed as a natural component of a starting material containing both fat and protein, such as emulsified chicken skins or dried cheese solids, or as an added component to a more complex reaction mixture in accordance with the teachings of the patents and patent application referred to above, the disclosures of which are hereby incorporated by reference.

The preferred method of preparing the high free fatty acid fat is that described in the above Howley et al. application. According to that disclosure, the palatability enhancer, which comprises a high free fatty acid fat, is obtained by preparing a first stage reaction product by reacting a proteinaceous or farinaceous substrate with an enzyme or enzyme mixture in amounts, under conditions of pH and temperature, and for a time effective to partially hydrolyze and substrate; emulsifying the first stage reaction product with the fat, and then enzymatically treating that emulsion with lipase and protease in amounts, under conditions of pH and temperature, and for a time, effective to cause an enzyme reaction resulting in the production of a palatability enhancer containing a high free fatty acid fat.

While not known to be limited to specific proteinaceous substrates for preparation of the first stage reaction product, soy, whey, chicken skins, and cheese materials are presently preferred. Among the various soy products, whole sweet whey is preferred. Similarly, dry cheese solids and emulsified chicken skins are the preferred forms of these proteinaceous materials.

The protein employed can be any which provides a positive palatability response. It is most practical to select a proteinaceous material which is effective not only for its contribution to palatability, but which, after reaction in the first stage of the process, provides the degree of emulsification necessary to fully emulsify the fat in the second stage of the process.

Where the substrate for the first stage reaction comprises a proteinaceous material, the enzyme effective to achieve the requisite partial hydrolysis will be a protease enzyme. Particularly preferred protease materials are those derived from B. subtilis. It is contemplated that any protease enzyme derived from plats, animals or microorganisms can be employed as long as it is capable of providing the improvement in palatability required by Howley et al. In addition to protease from B. subtilis, plant proteases such as bromelain and papain, and animal-derived enzymes such as trypsin and pepsin can be employed. While the degree of reaction is dependent upon a number of factors, the proteolytic enzyme will typically be employed in an amount effective to provide generation of desired polypeptides to achieve palatability enhancement in the final product by partial hydrolysis of the protein, within the processing time desired.

The various proteolytic enzymes come in a wide variety of commercial forms, including dry, purified enzymes; enzymes supported on various soluble and insoluble carriers; and enzyme solutions of varying strength. For ease of handling, especially in view of the effectiveness of these materials on body tissues, it is preferred to employ the enzyme in the form of a liquid solution. In the case where a protease enzyme is employed in the first stage to partially hydrolyze a proteinaceous material, the reaction hydrolyze a proteinaceous material, the reaction is preferably continued at reactant concentration, pH, and for a time effective to convert portions of the proteinaceous material to peptides. The reaction conditions will, of course, be selected to achieve the optimum results with the particular protease enzyme and protein substrate identified. The general reaction scheme will, however, be similar to that described for the enzymatic reaction described below where the first stage substrate comprises a farinaceous material.

In the case where a farinaceous material is employed in the first stage reaction, the farinaceous material can be any of those which are employed in the dog food composition itself, or, if desired, can be a material different from those comprising the major proportion of the farinaceous ingredients. Of the farinaceous materials which can be employed, corn and wheat, preferably in their whole ground form, are the most preferred. Corn is the preferred farinaceous material and can be employed alone or in combination with wheat or a proteinaceous material. Wheat is desirable alone or in combination because it contains beta-amylase which further acts to hydrolyze the starch, but at points in its polymeric structure different from those subject to cleavage by alpha-amylase.

The slurry for enzymatically reacting the farinaceous material will typically contain from about 30% to about 70% water. The amount of water is preferably kept to the lowest level consistent with good reaction rate and flowability of the products.

The amylase enzyme should be added in an amount which is effective to convert at least a portion of the farinaceous material to a mixture of oligosaccharides ranging in size from 1 to 10 monomer units. To provide reproducibility and process control, it is desirable to employ enzymes which are heat labile, thereby permitting them to be inactivated by simply heating them to a temperature effective for that purpose. Among the suitable enzymes are alpha-amylase, derived from plants, animals or microorganisms. Preferably, a non-heat-stable bacterial alpha-amylase is employed which also has proteolytic action. Typical of these are alpha-amylase from B. subtilis.

Alpha-amylases randomly attack the alpha-1–4 bonds in a starch or dextrin molecule, resulting in the fragmentation of both linear and branched fragments of starch, i.e., dextrinization. Fungal alpha-amylase primarily converts linear glucose chains to maltose units as the final product. If sufficient time is allotted, under certain conditions, alpha-amylase alone can be made to convert linear glucose chains mostly to a mixture of maltose and dextrose, and branched fragments to a mixture of maltose, dextrose and panose. The panose is a trisaccharide containing 1-6 likages and, therefore, cannot be broken by the alpha-amylase. Thus, where both enzymes are employed in combination, as preferred, the bacterial alpha-amylase acts to rapidly break up the starch into dextrins and oligosaccharides and has some limited effect on the protein in the material, and the fungal alpha-amylase proceeds to split off individual maltose molecules from the non-reducing ends of these reaction products.

The exact reaction conditions for the enzymatic reaction will vary depending upon the particular type of enzyme and its source. Typically, however, it is preferred to select enzymes which react rapidly at temperatures within the range of from about 35° C. to about 120° C., preferably within the range of from about 43° C. to about 65° C. Employing enzymes which react within these temperatures ranges will provide an efficient utilization of the heat of the reaction slurry when mixed with the reactants including fat in the second stage of the process.

As with the temperature, the pH will be dependent upon the particular type and source of enzyme; and, the enzymes should be selected to react effectively at pH conditions typical for the farinaceous ingredients involved, namely a pH within the preferred range fo from about 3 to about 7.

It is preferred to complete the reaction as rapidly as possible to minimize the size of the reactor and the quantity of the heat required for the process. The reaction time is, however, dependent upon the other factors which control the rate of reaction. Within these constraints, reaction periods of from about 10 minutes to about 4 hours will be practical.

Following the first stage reaction, the first reaction product is then admixed with fat to form an emulsion which is then further reacted with lipase and protease. These enzymes can be added and the reactions effected sequentially; however, it is preferred that they be added as a mixture and that the second stage reaction be a combined hydrolysis of fat and protein. In the case where the first stage reaction product comprises a proteinaceous material, there will be no need to add additional proteinaceous material in the second stage reaction; however, of course, this can be done if desired. In the case where the first stage reaction substrate comprises a farinaceous material, the farinaceous material will include a portion of protein, but it is generally preferred to employ additional protein to the second stage reaction mixture to supplement the protein content of the farinaceous material.

The process for conditioning the mixture of fat and protein according to the second stage of the reaction broadly comprises emulsifying the fat and treating the mixture of protein and emulsified fat with lipase and protease. The reaction between the emulsified fat-protein mixture and the enzymes is believed to produce a complex array of reaction products. The fat reacts with the lipase to produce free fatty acids and mono and diglycerides. The protein reacts with the protease to produce polypeptides and free amino acids. It is further possible that other reactions occur.

It is considered important to emulsify the fat before treatment with the enzymes. This is because emulsification increases the fat-water interfacial area, thereby facilitating the heterogeneous reaction between the fat and the lipase. Emulsification can be obtained through the addition of an emulsifier; or, as in the case where the fat-protein mixture comprises a meat slurry, the meat slurry will impart a limited natural emulsifying effect. Where an emulsifier is added, it is preferably proteinaceous. Soy flour is a particularly preferred proteinaceous emulsifier for use according to the present invention. Obviously, however, a non-proteinaceous emulsifier can be employed. Typical of the non-proteinaceous emulsifiers are sodium stearoyl-2-lactylate and succinylated monoglycerides. While the exact concentration of the emulsifier is not believed critical, it is typically employed in amounts ranging from about 0.5% to 20% by weight based on the weight of the fat.

The lipase and protease employed in the reaction may be derived from any suitable source as long as they contain effective amounts of these enzymes when used at concentrations which will not adversely affect the palatability of the dog food. Preferably, if any enzyme mixture is employed, it should contain from about 20 to 250 lipase units per gram and from about 500 to 7,000 protease units per gram. Also, however, separate sources for the lipase and protease can be employed, and the enzymes added either simultaneously or sequentially. A lipase unit is defined as that amount of the enzyme which will hydrolyze 0.885 grams of olive oil calculated as triolein to diolein and oleic acid in two hours at 37° C. A protease unit is defined as that amount of the enzyme which will digest 1 mg. of casein in 1 minute at 50° C. at pH 7.5. Pancreatic lipase, which is an enzyme mixture containing about 200 lipase units per gram and about 6,000 protease units per gram is a particularly preferred enzyme mixture. The exact concentration at which the enzymes, in a mixture or individually, are employed is not considered critical as long as the enzymes are present in amounts effective under the desired reaction conditions to cause an enzymatic reaction resulting in the production of the high free fatty acid fat. The enzymes are typically employed in amounts sufficient to supply from about 20 to 250 lipase units and about 500 to 7,000 protease units per 100 grams fat. The enzymes can be admixed with the reaction mixture at any time before, during or after emulsification. Admixture after emulsification is, however, preferred.

To effect the reaction, the fat is admixed in liquid form with water, if desired the first stage reaction mixture and additional enzymes, vigorously agitated to effect emulsification, and maintained at suitable reaction conditions for a period of time sufficient to effect the reaction. In the case where the protein is to serve as an emulsifier, the protein is preferably present in the water before emulsification. In this case, it is preferably added and thoroughly admixed prior to adding the fat but can be added subsequent to fat addition. Where the fat is normally solid or plastic, it is preferably melted to the liquid state. The relative amounts of fat and water necessary for the reaction are not considered critical, but are desirably present at a fat-to-water ratio of from about 1:100 to 10:1, and preferably from about 1:4 to 1:1. The reaction mixture may also contain a promoter such as calcium chloride and sodium chloride.

It has been found that temperatures within the range of from about 35° C. to 50° C. are effective for both heating the reactants prior to admixture and for maintaining the reaction. This temperature range is, therefore, preferred; however, any reaction temperature effective to sustain the enzymatic reaction resulting in the production of the palatability enhancer can be employed. It is noted that lower temperatures (e.g., 20° to 35° C.) can be employed which would significantly diminish the results due to incomplete emulsification and reduced reaction rates. Also, somewhat higher temperatures (e.g., 50° to 65° C.) can be employed.

After emulsification, the enzymes are admixed with the emulsion and constant, efficient stirring is maintained for the reaction period to maintain a desirably high rate of reaction. The reaction will be continued for a period of time effective to sustain the enzymatic reaction resulting in the production of a high free fatty acid fat. Generally, it will be continued for a period of time ranging from about 5 minutes to 16 hours, typically from 15 minutes to 2 hours. Where the enzymes are added sequentially, the reaction in the presence of each enzyme will be continued for a period of time effective to provide the high free fatty acid fat containing composition as the produce of the combined reaction periods.

The pH during reaction has an effect on palatability, with alkaline reaction conditions producing the more preferred results; however, the pH can be maintained at any level which is effective to sustain the enzymatic reaction resulting in the production of the palatability enhancing composition. Typically, the pH is adjusted periodically to bring it to within the range of from about 4 to 9, preferably about 7 to 9, and most preferably from about 7.0 to 7.5.

After the desired period of reaction, the emulsion can be treated to inactivate the enzymes. Typically, it can be heated to an elevated temperature, on the order of about 70° to 95° C., for a period of time sufficient to inactivate the enzymes, on the order of about 5 to about 15 minutes.

Drying the High Free Fatty Acid Fat

The high free fatty acid fat obtained by the preferred process above, or otherwise, is processed to prepare a free-flowing particulate material.

The high free fatty acid fat is emulsified with sufficient water and encapsulating binder to permit drying such as by spray drying, drum drying or the like. The dried material is treated as necessary to provide a free-flowing particulate material. This may include subdividing to reduce the size of agglomerates, mixing with a flow control agent, or agglomerating.

When preparing by the preferred process, the high free fatty acid fat will be present predominantly in the oil phase of an oil-in-water emulsion. Depending upon the exact composition of the emulsion, the water content and the degree of emulsification, the emulsion may be dried directly upon completion of the reaction.

If necessary, the water content should be adjusted to within the range from about 40 to about 60%, based on the weight of the emulsion, and an encapsulating binder is dissolved in the emulsion in an amount effective to encapsulate the fat upon drying.

The encapsulating binder can be any of those known for preparing powdered fat compositions which wll be effective for the purposes of this invention. Among the known proteinaceous encapsulating binders are whey solids, buttermilk solids, egg whites, gelatin, casein, sodium caseinate, and neutral water soluble soy protein. The use of other materials including gums such as cellulose ethers, gum tragacanth and gum acacia, starches, dextrins, malto dextrins, corn syrup solids and sugars, can be effective encapsulating binders alone or in combinations with other materials. The binders of choice are those which are relatively non-hygroscopic and have good film forming properties.

In addition to the binders, a small proportion of hydrogenated fat can be added to raise the melting point of the fat thereby enhancing the physical characteristics of the dried product and facilitates the drying thereof. It may also be desirable to add low levels of an emulsifier to assure achievement of an emulsion which remains suitably stable for efficient drying in the desired encapsulated fat form.

The levels of these additives will, of course, vary with the composition of the high free fatty acid fat containing material and the drying conditions; however, they will be present in minor amounts. The encapsulating binder will typically be present at a level from about 5 to about 30% of the weight of the mixture to be dried, and the hydrogenated fat and emulsifier will typically be present at levels of less than about 3% on this same basis.

The level of free fatty acids in the mixture should be at least 5% based on the dry weight of the solids in the mixture. Preferably, the level will be above 10% and most preferably will be within the range of from 12 to 20% on this same basis.

Prior to drying, such as by spray drying, the mixture containing the high free fatty acid fat is preferably heated to a temperature effective to liquify all fatty materials and then subjected to high shear mixing to emulsify the mixture as an oil-in-water emulsion. Typically, the mixture will be heated to a temperature of from about 50° to about 90° C., e.g., about 70° C., and then passed through a homogenizer of the typical dairy type.

Once emulsified, the emulsion is then dried such as by spray drying or the like. In general, the drying equipment and conditions will be typical of those employed in preparing encapsulated fat products for such uses as coffee lighteners and whipped toppings.

After drying, the palatability enhancer of the invention, in the form of the encapsulated high free fatty acid fat, is collected in free flowing particulate form. For materials prepared by either spray drying or drum drying, it may be desirable to mix the encapsulated high free fatty acid fat with a flow improving material.

The palatability enhancer will desirably have a particle size distribution wherein the majority of particles are from 100 to 200 mesh (USS sieve).

According to one embodiment, the palatability enhancer of the invention is blended with wheat flour at a weight ratio within the range of from 1:2 to 2:1, preferably about 1:1.

Application of Dry Palatability Enhancer

The palatability enhancer of the invention is applied to the surface of a dog food in any manner and amount effective to provide an increase in palatability when the food is fed to dogs. It is preferred that the palatability enhancer of the invention be applied as the outermost coating on the dog food to achieve the highest flavor impact.

The level of application cannot be defined by a numerical range of percentages of universal application. The palatability enhancer of the invention will preferably be employed as only one portion of a coating to a dog food which includes several enhancers. Typically, the coating will include beef tallow, a liquid enhancer as prepared by the Haas and Lugay or the Howley et al process, and the dry palatability enhancer of the invention. In combination coatings of this type, levels of addition as low as 0.5% based on the total weight of the dry dog food have provided statistically significant strong preferences over the same base foods without it. Levels within the range of from about 0.1 to about 5.0 percent will be effective in varying degrees, depending on the composition of the base food and the flavorful materials it contains.

Application is typically accomplished by dusting onto the dog food in a coating reel, following application of a surface tackifier such as liquid fat or other palatability enhancer.

While the applicability of the present invention is not limited to any particular type of dog food formulation, those skilled in the art recognize that nutrition is of paramount importance. It is important that each dog food be nutritionally complete. Where this is done, it is not necessary for the dog owner to balance the quantities of different foods. Thus, the nutritional intake of the dog is assured so long as it intakes a minimum amount of food. Nutritionally-balanced foods will contain protein, carbohydrates, fates, vitamins and minerals in amounts established by feeding tests to be sufficient for proper growth and maintenance. To be sure that the dog does take a minimum amount of food over a period of time, it is essential that the food be palatable. The contribution of the present invention to palatability is important in this regard.

The process of the invention can be employed to improve the palatability of virtually any pet food. The process can be employed in the preparation of dry, intermediate moisture, or canned pet foods. It is presently believed, however, to be especially important for use with dry foods because of their relative need for some flavor improvement as compared to canned or soft-moist foods, and because the advantages of this palatability enhancer are most pronounced in dry form.

The dry dog food can contain as much as 10% moisture without the need for high levels of antimicrobial agents. Dry dog foods typically have moisture contents of from about 8 to about 9% and usually have a dry, crunchy texture. some dog foods are characterized as dry, but have moisture contents up to about 15% by weight and show a soft texture due, in part, to the additional water and, in part, to the plasticizing character of added agents, such as glycerol and propanediol. The intermediate-moisture foods are typically defined as those having moisture contents of above about 15% and less than about 50%, and typically will have a soft texture with moisture contents of less than about 30%. The canned dog foods will have moisture contents above 50%, and typically above 70%.

The nutritionally-balanced dog foods prepared according to the present invention will comprise from 20 to 80% farinaceous ingredients and from 20 to 80% proteinaceous ingredients. They are preferably prepared by expansion from an extruder to obtain a porous texture; however, they can be shaped by other conventional means to provide an unexpanded product or one which is texturized in other known ways. The products can be dried to a moisture content of less tha 10% to provide either a soft or a crunchy texture depending upon the use of various plasticizers such as polyhydric alcohols or other texture-modifying ingredients.

The processing to form the base dog food can be in substantial accordance with the procedure set out in U.S. Pat. No. 3,119,691 to Ludington et al, the disclosure of which is hereby incorporated by reference. According to that disclosure, the ingredients are mixed, extruded, cut, dried and then coated.

The following examples are presented for the purpose of further illustrating and explaining the present invention and describing the best mode presently known for carrying it out. These examples are not intended to be taken as limiting in any regard. Unless otherwise indicated, all parts and percentages are based upon the weight of the product or portion thereof at the indicated stage of the processing.

EXAMPLE 1

A palatability enhancer, according to the present invention, is prepared from the following basic formulation:

| Ingredient | Parts |
| --- | --- |
| Water | 46.6 |
| Cheese Solids | 6.0 |
| Soy Concentrate | 4.0 |
| Protease | 0.03 |
| NaCl | 0.65 |
| CaCl$_2$ | 0.3 |
| Tallow | 23.2 |
| Na OH | As needed |
| Lipase | 0.12 |
| Corn Dextrins | 4.47 |
| Whole Sweet Whey | 11.86 |
| Casein | 3.0 |

The protease enzyme was derived from B. subtilis and has an assayed protease activity of 700 Northrup Units (NU) per gram, wherein 1 NU is that amount of enzyme which gives 40% hydrolysis of one liter of casein substrate in 60 minutes, under standardized conditions; an assayed alpha-amylase activity of $2 \times 10^6$ Modified Wohlgemuth Units (WGU) per gram, wherein 1 WGU is defined as that amount of enzyme which will dextrinize one milligram of soluble starch to definite sized dextrins in thirty minutes under standardized conditions, and beta-glucanase activity.

The palatability enhancer is prepared by adding the water and the cheese solids and soy concentrates as substrates to a stirred kettle and vigorously agitating to provide a stable dispersion. After agitation, the protease enzyme is added and the first stage reaction mixture is then maintained under agitation for 30 minutes at a temperature of about 52° C. The pH at the start of the reaction is about 5.0 to 6.5 and does not significantly change during the reaction. On completion of the 30-minute first stage reaction, the sodium chloride and calcium chloride are added to the first stage reaction mixture and dissolved. The tallow, which has been pre-heated to a temperature of about 60° C. to liquify it, is then added to the kettle and vigorously agitated sufficiently to form a stable emulsion. At this stage, a sufficient amount of sodium hydroxide is added to adjust the pH to about 7.5. The lipase (pancreatic lipase, which is a mixture of lipase and protease, having a lipase activity of about 220 lipase units per gram and a protease activity of about 6000 protease units per gram) is then added and thoroughly dispersed within the second stage reaction mixture which is then maintained at a temperature of about 50° C. for one hour while intermittently adding sufficient sodium hydroxide to control the pH to a level of about 7.5. Upon completion of the reaction, the corn dextrins, while sweet whey and casein are added as encapsulating binders and the mixture is then heated and homogenized (Gaulin) at a pressure of about 1700 psi. The heating serves to inactivate the enzymes and liquify the fat. The material is then spray dried in a swill chamber using a Deleven Nozzle #27 at a rate of 1400 lbs. per hour. The dryer discharge temperature is maintained at 68° C. by varying the inlet air temperature, to achieve to a final product moisture content of about 4% to provide a powder which is collected as the palatability enhancer having the following particle size distribution:

| Screen Size (USS) | % on Screen |
| --- | --- |
| 100 mesh | 22.4% |
| 120 mesh | 26.1% |
| 170 mesh | 32.0% |
| 200 mesh | 10.3% |

-continued

| Screen Size (USS) | % on Screen |
| --- | --- |
| 230 mesh | 6.5% |
| 270 mesh | 2.0% |
| Pan | 0.7% |
| | 100.0% |

EXAMPLE 2

A palatability enhancer according to the invention is prepared in accordance with Example 1, but the formulation is modified as follows to obtain better spray drying and a better handling product:

| Ingredient | Parts |
| --- | --- |
| Water | 46.6 |
| Cheese Solids | 6.0 |
| Soy Concentrate | 2.0 |
| Protease | 0.03 |
| NaCl | 0.65 |
| CaCl$_2$ | 0.03 |
| Tallow | 17.9 |
| Lipase | 0.12 |
| NaOH | 2.8 |
| Corn Dextrins | 2.16 |
| Whole Sweet Whey | 12.6 |
| Casein | 3.0 |
| Hydrogenated Tallow (added after reaction) | 1.1 |

The above description is for the purpose of teaching those skilled in the art how to practice the invention and is not intended to recite all the possible modifications and variations thereof which will become apparent to the skilled worker upon reading. It is intended, however, that all such modifications and variations be included within the scope of the invention which is defined by the following claims.

I claim:

1. A method of enhancing the palatability of a nutritionally balanced dog food with high levels of fats including high free fatty acid fats and which is resistant to package staining comprising:
   blending a high free fatty acid fat, an encapsulating binder comprising a protein or a carbohydrate, and water to from an emulsion;
   drying said emulsion to produce a palatability enhancer in flowable, particulate form;
   providing pieces of dog food having exterior surfaces; and
   mixing said palatability enhancer in flowable, particulate, form with said pieces of dog food.

2. A method according to claim 1, wherein said mixing causes said palatability enhancer in flowable particulate form to adhere to the exterior surfaces of said dog food pieces.

3. A method according to claim 2 further comprising:
   coating a liquifiable fatty material solidified on the exterior surfaces of said pieces of dog food prior to said mixing, wherein said coating enables said palatability enhancer to adhere to said pieces of dog food.

4. A method according to claim 3, wherein said fatty material comprises high free fatty acid fats.

5. A process according to claim 2, wherein said emulsion further comprises protein hydrolyzed to the extent that desired polypeptides are generated to achieve palatability enhancement of said dog food.

6. A process according to claim 5, wherein the hydrolyzed protein is prepared by treating protein with 500 to 700 protease units per gram of protein, said protease units being the amount of enzyme needed to digest 1 milligram of casein at 50° C. at a pH of 7.5.

7. A process according to claim 11, wherein said drying is achieved by spray drying.

8. A process according to claim 11, wherein said drying is achieved by drum drying.

9. A process according to claim 11, wherein said high free fatty acid fat is prepared by saponification.

10. A process according to claim 1, wherein the high free fatty acid fat is prepared by subjecting a fat to lipolysis under conditions effective to liberate free fatty acids.

11. A process according to claim 10, wherein the fat comprises a milk fat, chicken fat, tallow, or lard.

12. A process according to claim 10, wherein the lipolysis is carried out under conditions effective to liberate at least 10% free fatty acids based on the weight of the fat.

13. A process according to claim 11, wherein the high free fatty acid fat is prepared by a process comprising:
   preparing a first stage reaction product by dispersing a substrate comprising a proteinaceous or farinaceous material in water and reacting the substrate with an enzyme or enzyme mixture in amounts, under conditions of pH and temperature, and for a time effective to partially hydrolyze the substrate;
   preparing an emulsion by mixing fat with said first stage reaction product; and
   reacting said emulsion with lipase and protease in amounts, under conditions of pH and temperature, and for a time effective to cause an enzyme reaction.

14. A process according to claim 13, wherein the substrate comprises at least one member selected from the group consisting of soy, whey, blood plasma, egg, chicken skins, and cheese, and the enzyme comprises a protease.

15. A process according to claim 14, wherein the substrate comprises at least one member selected from the group consisting of soy, whey, and mixtures thereof.

16. A process according to claim 14, wherein the substrate comprises at least one member selected from the group consisting of soy flour, chicken skins, and mixtures thereof.

17. A process according to claim 13, wherein the substrate comprises corn, and the enzyme comprises amylase.

18. A process according to claim 17, wherein the substrate comprises whole ground corn, and the amylase is derived from B. subtilis.

19. A process according to claim 11, wherein the dog food is nutritionally balanced for dogs in terms of its fat, protein, carbohydrate, and vitamin and mineral contents, and contains from 20 to 80% of farinaceous material and from 20 to 80% of proteinaceous material.

20. A method of enhancing the palatability of a nutritionally balanced dog food with high levels of fats including high free fatty acid fats comprising:
   preparing an aqueous mixture which comprises a high free fatty acid fat and an encapsulating binder comprising a protein or a carbohydrate;
   drying said aqueous mixture to produce a palatability enhancer in flowable, particulate form;
   providing pieces of dog food having exterior surfaces coating as a liquid a liquifiable fatty material comprising a mixture of high free fatty acid fats and tallow on the exterior surfaces of said pieces of dog food; and mixing said palatability enhancer in flowable particulate form with said pieces of dog food coated with said liquifiable fatty material in solidified form.

21. A method according to claim 20, wherein said palatability enhancer constitutes 0.1 to 5.0 wt % of said dog food coated with said liquifiable fatty material and said palatability enhancer.

22. A method according to claim 21, wherein said palatability enhancer constitutes at least 0.5 wt % of said dog food coated with said liquifiable fatty material and said palatability enhancer.

23. A nutritionally balanced dog food with high levels of palatability enhancing fats including free fatty acid fats which is resistant to package staining comprising:

pieces of doog food having exterior surfaces and
a palatability enhancer in flowable, particulate form mixed with said pieces of dog food, wherein said palatability enhancer comprises high free fatty acid fat encapsulated in a dry binder comprising a protein or a carbohydrate, said palatability enhancer being produced by drying an emulsion of the free fatty acid fat and either the protein or the carbohydrate.

24. A dog food according to claim 23, wherein said palatability enhancer in flowable particulate form adheres to the exterior surfaces of said dog food pieces.

25. A dog food according to claim 24, further comprising:

a coating of liquifiable fatty material on the exterior surfaces of said pieces of dog food, wherein said coating enables said palatability enhancer in flowable particulate form to adhere to the exterior surfaces of said pieces of dog food.

26. A dog food according to claim 25, wherein said coating of fatty material comprises high free fatty acid fats.

27. A dog food according to claim 23 wherein the high free fatty acid fat comprises a free fatty acid content of at least 10% based on the weight of the fat.

28. A dog food according to claim 23, wherein the high free fatty acid fat comprises a saponified fat.

29. A dog food according to claim 23, wherein the high free fatty acid fat comprises a lypolyzed fat.

30. A dog food according to claim 29, wherein said palatability enhancer further comprises:
(hydrolyzed) protein.

31. A dog food according to claim 29, wherein the high free fatty acid fat comprises the lipolytic digestion product of milk fat, chicken fat, tallow, or lard.

32. A dog food according to claim 23, wherein a majority of the particles of said palatability enhancer have a size of from 100 to 200 mesh.

33. A dog food according to claim 32, wherein the high free fatty acid fat comprises a free fatty acid content of at least 10% based on the weight of the fat.

34. A dog food according to claim 33, wherein said palatability enhancer further comprises:

a protein hydrolyzed to the extent that desired polypeptides are generated to achieve palatability enhancement of said dog food.

35. A nutritionally balanced dog food with high levels of palatability enhancing fats including free fatty acid fats comprising:

pieces of dog food having exterior surfaces;
a palatability enhancer in flowable, particulate form mixed with said pieces of dog food, wherein said palatability enhancer comprises high free fatty acid fat encapsulated in a dry binder comprising a protein or a carbohydrate, said palatability enhancer being produced by drying an emulsion of the free fatty acid fat and either the protein or the carbohydrate in water; and
a coating of liquifiable fatty material on the exterior surfaces of said pieces of dog food, wherein said coating comprises a mixture of high free fatty acid fats and tallow and enables at least some of said palatability enhancer in flowable particulate form to adhere to the exterior surfaces ofs aid pieces of dog food.

36. A dog food according to claim 35, wherein said palatability enhancer constitutes 0.1 to 5.0 wt % of said dog food.

37. A dog food according to claim 36, wherein said palatability enhancer constitutes at least 5.0 wt % of said dog food.

* * * * *